May 9, 1944.    C. C. COLE    2,348,243

FLUID MOTOR

Filed Feb. 9, 1942

Inventor
C. C. Cole

Patented May 9, 1944

2,348,243

UNITED STATES PATENT OFFICE 2,348,243

FLUID MOTOR

Cawthern C. Cole, Whittier, Calif.

Application February 9, 1942, Serial No. 430,085

5 Claims. (Cl. 121—150)

This invention relates to fluid motors of the reciprocating piston type having a fluid operated control valve.

In fluid motors having fluid operated as distinguished from mechanically operated valves difficulty is experienced in exhausting fluid trapped ahead of the valve to permit functioning of the same and at the same time preventing a connection between fluid supply and exhaust being temporarily established. An important object of my invention is the provision of a novel and improved motor which provides for the discharge of fluid from ahead of the valve and for positive shifting of the same by the motive fluid.

In Patent No. 2,276,783 for an improvement in "Fluid operated motors for deep well pumping equipment," of which I am a joint inventor, a motor structure is disclosed which incorporates a fluid operated valve in the form of a sleeve assembled on the piston, and has its exhaust through a hollow piston rod. This construction is satisfactory for the operation of well pumps. For other applications, for example, in aircraft hydraulic systems, it is advantageous to have the valve chamber separate from the piston thereby simplifying the disposal of exhaust fluid. A separate valve chamber further permits the employment of a relatively smaller and simpler valve member which may be readily removed or replaced in the event of wear without disturbing the piston and any apparatus to which it may be attached. It is, therefore, another important object of my invention to provide a motor having a valve chamber separate from the piston.

A further object of my invention is the provision of a motor of the character described operative by either a compressible or an incompressible fluid.

Other objects and advantages of my invention will become apparent hereinafter and in the accompanying illustrative drawing, in which.

Figure 1:
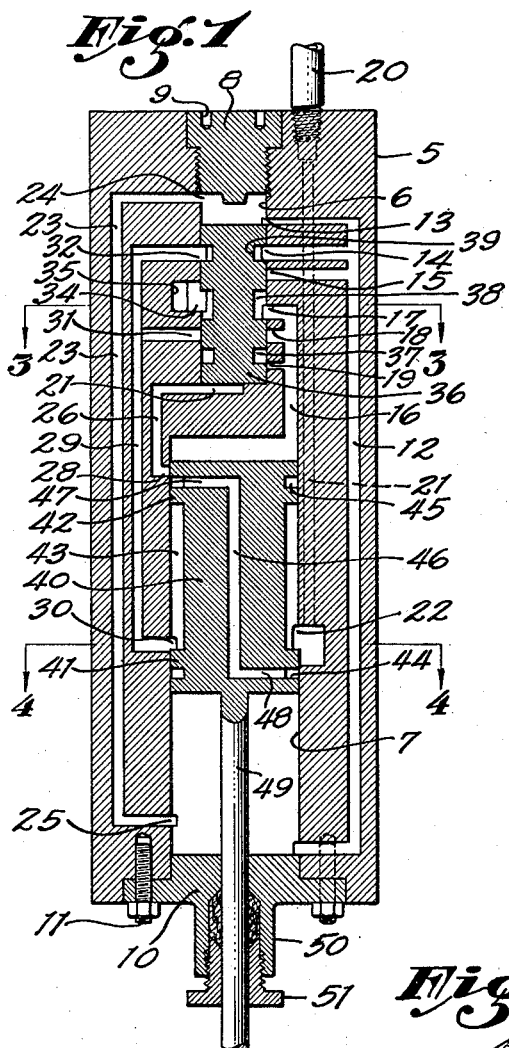
Fig. 1 is a vertical sectional view of the motor, with the piston rod and fluid supply pipe in elevation.
Figure 2:
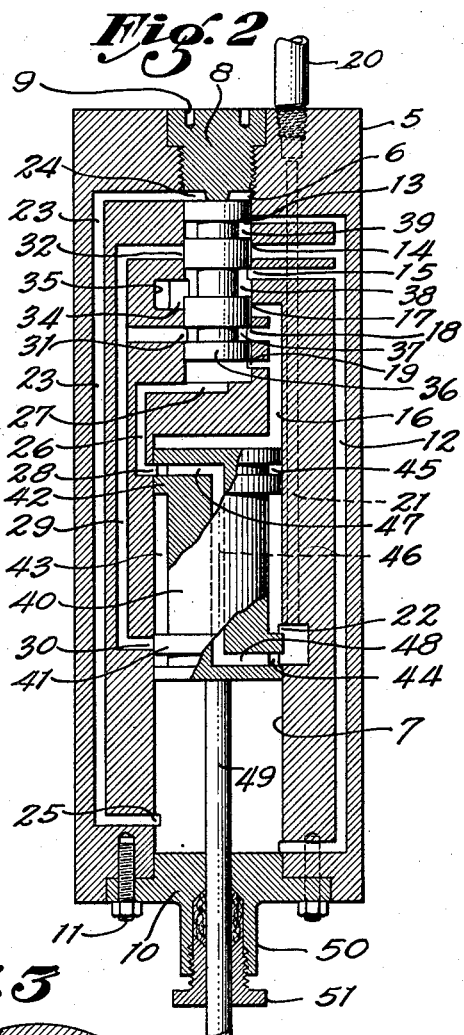
Fig. 2 is similar to Fig. 1 showing the motor body in vertical section, the valve, fluid supply pipe and piston rod in elevation and the piston partly in vertical section and partly in elevation. The valve and piston are shown as shifted relative to Fig. 1.

Referring to Figs. 1 and 2 by means of reference numerals, 5 designates the motor body which provides valve chamber 6 and piston chamber 7. Plug 8 providing sockets 9 adapted to receive a suitable wrench closes the valve chamber. Head 10 closes the piston chamber and is secured to the motor body by stud bolts 11. Fluid passages and ports are formed in the motor body 5 as follows: Passage 12 extends from the lower end of the piston chamber and opens into the valve chamber through the three branch ports 13, 14 and 15; passage 16 is similar to 12 and extends from the upper end of the piston chamber and opens into the valve chamber through the three ports 17, 18 and 19. Fluid supply pipe 20 threadably engages motor body 5 and is in communication with passage 21 which opens into the piston chamber at its longitudinal midpoint through supply port 22. Passage 23 provides a connection between the upper end 24 of the valve chamber and port 25 located adjacent the lower end of the piston chamber. A similar passage 26 connects the lower end 27 of the valve chamber to port 28 located adjacent the upper end of the piston chamber. Passage 29 connects port 30 formed in the piston chamber wall to ports 31 and 32 opening into the valve chamber.

Figure 3:
Fig. 3 is a transverse sectional view taken at 3—3 in Fig. 1.

Numeral 34 designates the exhaust port which is in communication with passage 35, shown in Fig. 3 as threaded to receive a pipe leading to a suitable exhaust reservoir.

As shown, valve member 36 is cylindric in form and provides the annular grooves 37, 38 and 39.

Piston 40 is provided with end flanges 41 and 42 which serve to define the wide annular groove 43. Annular grooves 44 and 45 formed in the piston flanges, as shown, are connected by the piston longitudinal passage 46 and transverse passages 47 and 48.

Piston rod 49 extends through the stuffing box 50 and gland 51.

Figure 4:
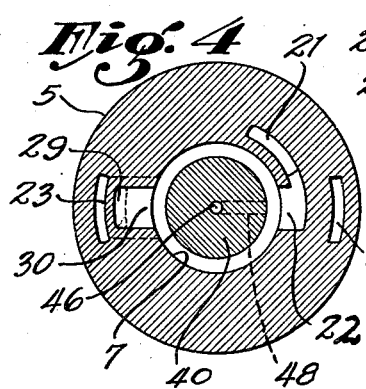
Fig. 4 is a transverse sectional view taken at 4—4 Fig. 1.

Passage 21 connects supply port 22 to pipe 20 which in turn leads to a source of motive fluid under pressure. Figs. 3 and 4 show how passage 21 is circumferentially offset to clear the branch ports 13, 14 and 15.

In the operation of the invention pipe 20 is connected to a source of motive fluid under pressure. This source may take the form of a pump supplying oil or air. The kind of fluid utilized being determined by the particular application of the motor. Motive fluid supply pumps are well known in the art; numerous examples may be found in engineering and patent literature and consequently need not be described here.

Referring to Fig. 1, with pipe 20 connected to a source of motive fluid and with valve 36 and piston 40 in the positions shown fluid will flow along passage 21 to supply port 22, by way of annular groove 43 to port 30, along passage 29, through port 32, valve groove 39, port 14 and thence along passage 12 to the lower end of piston chamber 7 to force the piston in the upward direction. Exhaust of fluid from ahead of the piston is through passage 16, port 17, valve groove 38, exhaust port 34, and exhaust passage 35 in communication with port 34. It will be noted that valve groove 38 is sufficiently wide to be in registration with exhaust port 34 at all times. It will further be seen that fluid in the upper end of the valve chamber 6 is under supply pressure by way of port 13, passage 12 and also port 25 passage 23 and opening 24 whereby the valve is securely held in its control position.

As the piston continues to travel upwardly, piston groove 44 comes into communication with supply port 22 and a passage leading to the lower end of valve chamber 6 is set up by way of passages 48, 46, 47, 45, 29, 26 and 21. At this point and for a very brief period of time pressures above and below the valve are equal. However, there being no net effective pressure, valve does not start to shift. Referring now to Fig. 2, it will be seen that piston continues to move upwardly until piston flange 41 closes off port 30 thereby entirely closing off the supply of motive fluid to the piston chamber and as above outlined, a passage is established connecting the lower end of the valve chamber to supply port 22. As the valve starts to shift in the upward direction fluid trapped in the upper end of the valve chamber is forced out through passage 24, 23 and by way of port 25 into the lower end of the piston chamber, which, at this time, it will be noted, is closed off from both exhaust and supply. As previously described, however, the upper end of the piston chamber is open to exhaust by way of passage 16, refer to Fig. 1. Consequently, the piston is forced upwardly a small distance and a quantity of fluid equivalent to that discharged into the lower end of the piston chamber by the initial movement of the valve is exhausted from the upper end of the piston chamber. Further movement of the valve connects the lower end of the piston chamber to exhaust by way of passage 12, port 15, valve groove 38 and exhaust port 34. Consequently, fluid discharged from ahead of the valve during the latter part of its movement is conducted to exhaust.

Fig. 2 shows the valve at the upper limit of its travel. As the valve reaches this position starting port 19 is opened and, as already explained, a connection exists between fluid supply and the lower end of the valve chamber, motive fluid is conducted by way of passage 16 to the upper end of the piston chamber starting the piston in the downward direction. Downward movement of the piston connects port 39 to annular groove 43, thereby establishing a passage for the flow of motive fluid from supply port 22 through annular groove 43, port 30, along passage 29, through port 31, valve groove 37, port 18 and passage 16 to the upper end of piston chamber.

The piston continues to travel downwardly until flange 42 closes off port 30, piston groove 44 registers with port 25 and supply port 22 registers with groove 45. Motive fluid is then conducted from port 22 along passages 47, 46 and 48, through port 25, and passage 23 to the upper end of the valve chamber. The valve is urged downwardly and fluid trapped ahead of it, that is below it, is forced into the upper end of piston chamber, which is closed off from exhaust and supply. The piston is forced downwardly a small distance and since the lower end of piston chamber is still open to exhaust a quantity of fluid equivalent to that discharged from the valve chamber by initial valve movement is expelled to exhaust. Continued movement of the valve opens the upper end of the piston chamber to exhaust, as shown in Fig. 1, by way of passage 16, port 17, valve groove 38 and exhaust port 34.

As shown in Fig. 1, starting port 13 opens as the valve completes its travel. Since as has been explained, a connection exists between supply port 22 and the upper end of valve chamber, motive fluid flows along passage 12 to the lower end of the piston chamber starting the piston in the upward direction. Initial upward travel of the piston opens port 30 to annular groove 43 and motive fluid then flows from port 22 to the lower end of piston chamber by the circuit first described and the upward travel of the piston is thereby continued. The cycle of motor operation thus being completed.

It will be apparent from the foregoing description of my invention that I have produced a fluid motor of novel and simple mechanical construction, having a fluid operated valve mechanically separate from the piston.

Inventors heretofore have experienced difficulty in discharging fluid trapped ahead of the valve to permit shifting of the same. It has been common practice to provide an initial connection to exhaust which generally involves a momentary connection between exhaust and supply. In the invention herein disclosed I overcome this difficulty and permit valve shifting by discharging the fluid ahead of the valve, initially, into a piston chamber end closed off from exhaust and subsequently to exhaust.

A further difficulty experienced with fluid motors having no fly wheel or like inertia device is a dead center at some point in their cycle. A study of the drawing and specifications will show that the motor disclosed herein has no dead center. This conclusion is borne out by the motors I have constructed according to the foregoing specifications.

Thus it will be seen that my invention contemplates a fluid motor operative by either a compressible or an incompressible fluid, having a fluid operated valve and a valve chamber mechanically separate from the piston; the shifting of the valve being permitted by discharging fluid from ahead of the same, initially, into a piston chamber end closed off from exhaust and subsequently to exhaust. My invention further contemplates a motor of the character described which is positive in action throughout its cycle of operation and has no dead center.

In view of this disclosure it will be apparent that changes could be made in the construction of the motor without departing from the scope of my invention. By way of examples, the control valve could provide suitable ports rather than the annular grooves shown; piston flanges 41 and 42 which control the opening and closing of port 30 could be constructed to control port 22 and thereby have the same effect on motor operation; the valve chamber may be entirely separate from the motor body. I have, in fact, constructed an experimental motor in accordance with this disclosure in which the only connection between the valve and piston chambers is by means of copper tubes which correspond to the passages shown.

Having thus described my invention, I claim:

1. In a fluid motor, a body providing a piston chamber and a valve chamber, a piston and a valve each in its respective chamber, a supply port opening into said piston chamber, ports in communication with said valve chamber respectively adjacent each end of said piston chamber and midway therebetween a port in communication with said valve chamber by way of two branch ports; said piston providing means to control the connection of said piston chamber ports with said fluid supply port, a passage means extending from each end of said piston chamber and each opening in to said valve chamber by way of three branch ports, said valve chamber ports being controllable by said valve.

2. In a fluid motor, a body providing a piston chamber and a valve chamber, a piston and a valve each in its respective chamber, a supply port opening into said piston chamber, a port adjacent each end of the same and extending respectively to opposite ends of said valve chamber, a port midway between said piston chamber ends and opening into said valve chamber by way of two branch ports, a passage extending from each end of said piston chamber, and each opening into said valve chamber by way of three branch ports, an exhaust port in said valve chamber in communication with an exhaust passage; said piston providing means to control said piston chamber ports and said valve providing means to control said valve chamber ports.

3. In a fluid motor, a combination as in claim 2, said piston having end flanges, a connecting body portion of relatively reduced diameter and providing a longitudinal passage opening laterally through said flanges.

4. In a fluid motor means forming a piston chamber, a piston therein, means separate from said piston forming a valve chamber, a valve therein, means to conduct fluid from the region beyond a valve end, during the first part of valve movement toward said region, to a piston chamber end closed off from exhaust, and means to conduct fluid from said region to exhaust during the last part of said valve movement.

5. In a fluid motor means forming a piston chamber, a piston therein, means separate from said piston forming a valve chamber, a valve therein, means to conduct fluid from the space beyond a valve end, during the movement of said valve toward said space, to a piston chamber end, closed off from exhaust during the first part of said valve movement and open to exhaust during the last part of said valve movement.

C. C. COLE.